US007746202B2

(12) United States Patent
Hagen et al.

(10) Patent No.: US 7,746,202 B2
(45) Date of Patent: Jun. 29, 2010

(54) MAGNETIC ACTUATING DEVICE

(75) Inventors: Jörg Hagen, Berlin (DE); Carsten Protze, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 191 days.

(21) Appl. No.: 11/908,807

(22) PCT Filed: Mar. 14, 2006

(86) PCT No.: PCT/EP2006/060672

§ 371 (c)(1),
(2), (4) Date: Sep. 17, 2007

(87) PCT Pub. No.: WO2006/097452

PCT Pub. Date: Sep. 21, 2006

(65) Prior Publication Data

US 2008/0224804 A1 Sep. 18, 2008

(30) Foreign Application Priority Data

Mar. 16, 2005 (DE) ...................... 10 2005 013 197

(51) Int. Cl.
*H01F 7/13* (2006.01)
*H01F 7/08* (2006.01)
*H02K 33/00* (2006.01)
*H02K 35/00* (2006.01)

(52) U.S. Cl. ...................... 335/274; 335/144; 335/180; 335/203; 335/220; 335/229; 335/253; 335/266; 335/270; 335/275; 335/276; 335/279; 310/14; 310/15

(58) Field of Classification Search .................. 335/16, 335/170, 55, 80, 95, 124, 131, 144, 153–154, 335/180–184, 187, 200–204, 220, 229, 232–239, 335/242, 249, 251–259, 261, 265–266, 269–279; 310/14–15

See application file for complete search history.

(56) References Cited

U.S. PATENT DOCUMENTS 1,817,592 A * 8/1931 Sokoloff ..................... 335/259
4,568,207 A * 2/1986 Hara et al. ............. 400/124.18

(Continued)

FOREIGN PATENT DOCUMENTS

DE 1 954 096 1/1967

(Continued)

*Primary Examiner*—Elvin G Enad
*Assistant Examiner*—Mohamad A Musleh
(74) *Attorney, Agent, or Firm*—Laurence A. Greenberg; Werner H. Stemer; Ralph E. Locher

(57) ABSTRACT

The invention relates to a magnetic actuating device containing a reference element and an adjusting element which is movably disposed between first and second end positions with respect to the reference element. The reference and/or adjusting elements contain a magnetizable material. A drive coil is provided for generating a magnetic field that moves the adjusting element from the first to the second end position. A mechanical clamping device is provided for producing mechanical forces that move the adjusting element from the second to the first end position. A fixing device is provided with a permanent magnet for generating a holding force fixing the adjusting element in the second end position with respect to the reference element. The fixing device contains a fixing unit separated from the adjusting element and provided with the permanent magnet.

12 Claims, 4 Drawing Sheets

U.S. PATENT DOCUMENTS

| | | | | |
|---|---|---|---|---|
| 5,646,588 | A * | 7/1997 | Cannon | 335/281 |
| 5,850,170 | A * | 12/1998 | Kern | 335/229 |
| 5,896,076 | A * | 4/1999 | van Namen | 335/229 |
| 6,337,612 | B1 * | 1/2002 | Kim et al. | 335/4 |
| 2004/0113731 | A1 * | 6/2004 | Moyer et al. | 335/220 |
| 2004/0164828 | A1 | 8/2004 | Morita et al. | |
| 2006/0082226 | A1 * | 4/2006 | Protze | 310/14 |
| 2006/0139135 | A1 | 6/2006 | Kampf et al. | |
| 2008/0136266 | A1 * | 6/2008 | Protze | 310/12 |

FOREIGN PATENT DOCUMENTS

| | | | |
|---|---|---|---|
| DE | 102 03 013 | A1 | 8/2003 |
| DE | 103 09 697 | B3 | 9/2004 |
| DE | 698 23 728 | T2 | 5/2005 |
| EP | 0 867 903 | A2 | 9/1998 |
| EP | 1 331 426 | A2 | 7/2003 |
| EP | 0 867 903 | B1 | 5/2004 |
| EP | 1 416 503 | A2 | 5/2004 |

* cited by examiner

MAGNETIC ACTUATING DEVICE

BACKGROUND OF THE INVENTION

Field of the Invention

The invention relates to a magnetic actuating device having a reference element, an actuating element which is arranged such that it can move relative to the reference element between a first limit position and a second limit position, with the reference element and/or the actuating element being composed of magnetic material, a drive coil for production of a magnetic field which moves the actuating element from the first limit position to the second limit position, a mechanical tensioning apparatus for storage of mechanical energy by means of which the actuating element can be moved from the second limit position to the first limit position, and a fixing device, which has a permanent magnet for production of a holding force which fixes the actuating element in the second limit position relative to the reference element. The invention also relates to a switching apparatus having a switch, as well as a magnetic actuating device such as this.

A magnetic actuating device such as this is preferably used to operate a high-voltage switch or circuit breaker. An actuating device such as this is known from EP 0 867 903 B1, which is designed to operate a vacuum-operated switch in order to interrupt a high-voltage circuit. In this actuating device, the actuating element is moved from a disconnected position to a connected position by means of an electromagnet against a resetting force from helical springs. The vacuum-operated switch is then closed in the connected position, that is to say a moving contact part of the vacuum-operated switch makes contact with a fixed contact part of the switch. A permanent magnet is also located on the actuating element, and its magnetic field acts in the movement direction of the actuating element. In the connected position, this permanent-magnetic force holds the actuating element fixed against the resetting effect of the helical springs. The force to be applied by the permanent magnet is therefore very large, which means that a correspondingly physically large permanent magnet must be fitted to the actuating element.

DE 103 09 697 discloses a magnetic linear drive which has an iron core and a coil. A movable armature has an associated yoke and an associated permanent magnet. When the armature is in a first limit position, it is held by magnetic holding forces, which are produced by the permanent magnet, and a yoke which bridges a gap in the iron core.

In a further magnetic actuating device which is known from the prior art, the actuating element is fixed in the limit positions by mechanical latching. This means that the mechanical latching ensures a holding force is provided in the movement direction of the actuating element. Mechanical latching such as this is, however, not always feasible in practice and, in addition, is susceptible to wear, this incurring considerable costs.

SUMMARY OF THE INVENTION

The invention is based on the object of providing a magnetic switching apparatus having a compact magnetic actuating device, in which the actuating element can be reliably fixed in the second limit position.

According to the invention, this object is achieved by an actuating device of this generic type in which the fixing device comprises a fixing unit, which contains the permanent magnet and is separate from the actuating element. The object is also achieved by a switching apparatus having a switch, as well as an actuating device such as this.

The provision of a fixing unit which is separate from the actuating element and has the permanent magnet means that there is no longer any need to fit a permanent magnet to the actuating element, as a result of which the actuating element can be designed to be considerably more compact. The reference element, which in general surrounds the actuating element, can accordingly therefore be designed to be smaller. This means that the entire magnetic actuating device can be designed to be more compact, while at the same time making it possible to reliably fix the actuating element in the second limit position.

In one advantageous embodiment, the fixing unit is arranged separately from the reference element. This allows a particularly compact embodiment for the unit, which is formed by the reference element and the actuating element, of the magnetic actuating device.

In one expedient embodiment, both the reference element and the actuating element are composed of magnetic material, in particular ferromagnetic material. The magnetic field which is produced by the drive coil can therefore act not only on the reference element but also on the actuating element, in order to move the actuating element from the first limit position to the second limit position.

The magnetic holding force produced by the fixing device advantageously acts transversely with respect to the movement direction of the actuating element. This allows the actuating element to be fixed in a technically particularly advantageous manner. This is because, when using a suitable force transmission device, the holding force which is required to fix the actuating element is then small in comparison to a force which moves the actuating element from the fixed position in the movement direction of the actuating element. The fixing can be provided reliably because of the relatively small magnitude of the force required to hold the actuating element. Only a correspondingly small amount of force need be applied as well in order to detach the actuating element from the fixing. Furthermore, the maintenance of the fixing does not incur major costs, since only a comparatively small holding force need be applied. The small holding force also means that there is scarcely any wear to the components to which it is applied, thus also reducing the maintenance costs.

It is particularly important to ensure reliable fixing of the circuit breaker in the current-flow position, in order to avoid unnecessary current interruptions. It is therefore expedient for a switch which is operated by the actuating element to produce a conductive connection when the actuating element is in the second limit position. The switch is therefore in a so-called “on position” when in this second limit position. In addition to the “on position” only one “off position” of the switch is permissible. When the switch is in the “off position”, the actuating element is in the first limit position, which is maintained by the mechanical tensioning apparatus.

It is also expedient for the reference element to be coupled to the actuating element via a lever arrangement which is designed to convert a force which is exerted by the actuating element on the lever arrangement in the movement direction of the actuating element to a force which acts transversely with respect to this and whose magnitude is less. The actuating element can therefore be held in the second limit position in a technically particularly simple and reliable manner by means of a holding force which is less than a resetting force applied to the actuating element. This makes it possible to reduce the costs involved in providing the holding force and to largely avoid wear to the component on which the holding force acts.

In a further preferred embodiment, the lever arrangement has a first lever, which can be attached to the reference element such that it can rotate, as well as a second lever, which can be attached to the actuating element such that it can rotate, in particular with the first lever and the second lever being connected to one another via a rotating joint. A lever arrangement such as this results in a reliable implementation of a force transmission apparatus, which is technically particularly simple, for converting a force acting in the movement direction of the actuating element to a force of less magnitude acting transversely with respect to the movement direction. A lever arrangement such as this is represented by a lever transmission which makes it possible to provide a force step-up ratio of, for example, a factor of 10. This means that the holding force required to fix the actuating element in the intended fixed position may, for example, be less by a factor of 10 than the resetting force applied to the actuating element by a reset spring.

In order to allow the actuating element to be held in the intended fixed position in a particularly simple manner, the rotating joint for connection of the levers is preferably coupled to a holding element, which is composed of a magnetic material. This magnetic material may, in particular, be a ferromagnetic material. A magnetic field which is provided in order to fix the holding element magnetizes a holding element such as this and exerts a corresponding magnetic holding force on it.

The magnetic field which originates from the permanent magnet of the fixing device is expediently used to fix the holding element on the fixing device which, in particular, is fixed relative to the reference element. This allows the actuating element to be fixed in the intended position in a technically particularly simple and reliable manner.

In order to ensure particularly reliable and stable fixing of the holding element on the fixing device, it is advantageous for the fixing device and the holding element to form parts of a closed iron circuit in the position in which the holding element is fixed on the fixing device. This means that the holding element closes an open position of a magnetic iron circuit. This results in one or two holding surfaces between the fixing device and the holding element. The latter increases the stability and holding force of the fixing. A second holding element is also preferably provided. In this case, the two holding elements can be completed by fitting an iron circuit on both sides to two iron parts which are arranged at a distance from one another, with one of the iron parts containing an element which produces a magnetic field, such as a permanent magnet. When two holding elements are used, this results in four holding surfaces for the holding element on the fixing device formed by the iron parts, thus allowing particularly stable fixing.

In another expedient embodiment, the mechanical tensioning device has a reset spring. This means that the circuit breaker can be reliably disconnected, once the holding element has been released from the fixed position, in a situation in which it is necessary to disconnect the current in the high-voltage circuit.

In order to allow the actuating element to be released from the fixed position with a minimal amount of energy being consumed, it is expedient for the fixing device to also have a magnetic disconnection coil, by means of which an opposing magnetic field can be produced, which counteracts the holding force produced by the permanent magnet. If the opposing magnetic field is now produced by means of the magnetic disconnection coil, then the holding force is reduced to such an extent that the force, for example of a reset spring, exceeds the holding force. In consequence, the holding element is moved away from the fixing device. Since the strength of the holding magnetic field decreases strongly as the distance between the holding element and the fixing device increases, the magnetic disconnection coil can be switched off again quickly as soon as the holding element is at a suitable distance from the fixing device. The actuating element is then automatically moved by the force of the reset spring, and with the disconnection coil switched off, to the opposite limit position, in particular back to the disconnected position. Since the disconnection coil may be operated only briefly in order to disconnect the switch, only a small amount of energy need be applied for this purpose as well, and can be provided, if required, by an appropriately designed capacitor.

One exemplary embodiment of an actuating device according to the invention will be explained in more detail in the following text with reference to the attached schematic drawings, in which:

DESCRIPTION OF THE INVENTION

Figure 2:
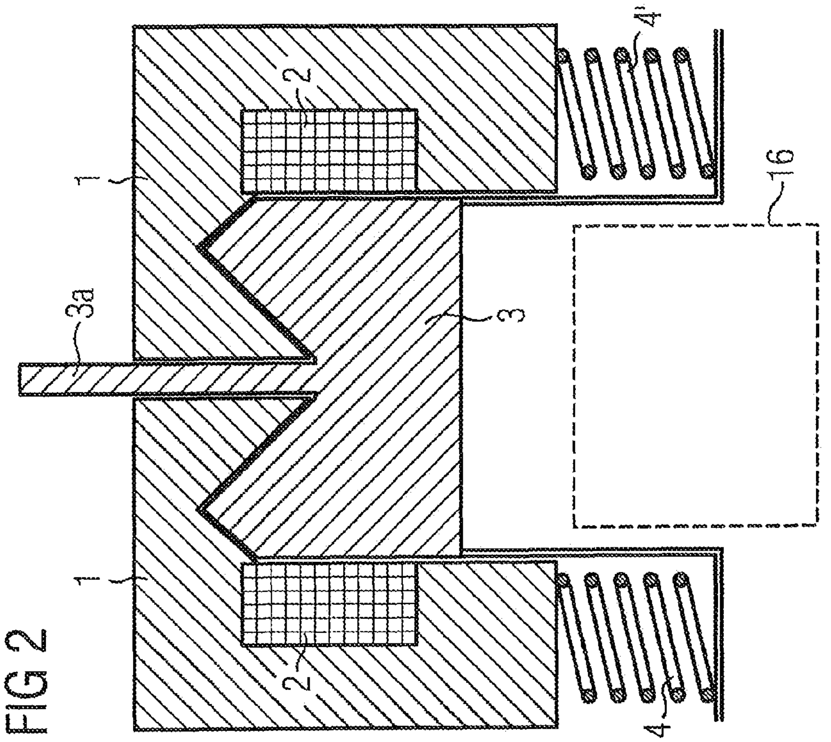
FIG. 2 shows a partial section illustration of the actuating device according to the invention as shown in FIG. 1, in which the actuating element is in a connected position.
Figure 1:
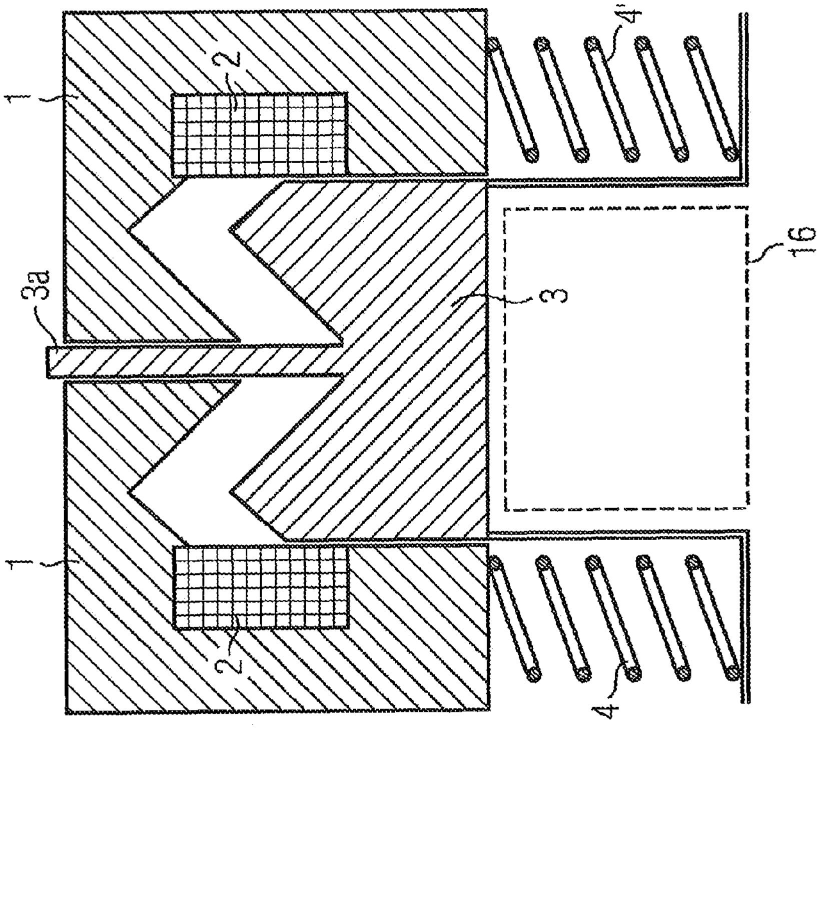
FIG. 1 shows a partial section view of an actuating device according to the invention, with an actuating element in a disconnected position.

FIGS. 1 and 2 show a magnetic actuating device according to the invention for operation of a high-voltage switch, in a first section view. This view shows an electromagnetic plunger-type armature drive which has a reference element 1 in the form of a stator and composed of ferromagnetic material, a magnetic drive coil 2 that is used as a connection coil, and an actuating element 3 which is in the form of an armature and is composed of ferromagnetic material. In this case, the actuating element 3 is rotationally symmetrical with respect to an axis running through an actuating rod 3*a* and can move within a recess, which is matched to the shape of the actuating element 3, in the reference element, backwards and forwards between a disconnected position, which is located low down in the drawing, and a connected position, which is located higher up.

The reference element 1 and the actuating element 3 have inclined armature and stator surfaces which correspond to one another and through which the magnetic flux from the drive coil 2 passes. This geometry makes it possible to make optimum use of the magnetic force produced by the magnetic drive coil 2, particularly when there is a long distance between the stator and armature surfaces.

FIG. 1 shows the actuating element 3 in the disconnected position. In this position, the contact elements of the high-voltage switch which is operated via the actuating rod 3*a* have been disconnected. The actuating element 3 is composed of ferromagnetic material and can be moved to the connected position, as illustrated in FIG. 2, by means of the magnetic drive coil 2, which is used as the connection coil. In this position, a small gap remains between the inclined surfaces of the reference element 1 and the actuating element 3, in order to prevent mechanical welding of the two elements.

During the connection process, two reset springs 4 and 4', which are each arranged between the actuating element 3 and the reference element 1, are compressed and therefore loaded. The reset springs 4 and 4' carry out the function of disconnection springs, since the reset force exerted by them on the actuating element 3 in the connected position forces the actuating element 3 back to the disconnected position again. In this case, the reset springs 4 and 4' are designed such that the gas opposing forces, which act as a function of the current to be disconnected by the high-voltage switch, can be overcome. Since the disconnection force is dependent only on the distance, it is independent of the duration of the opposing forces. The reset springs 4, 4' are preferably designed to produce maximum opposing forces after the disconnection movement.

In the connected position, the contact element, which is operated by the actuating rod 3*a*, of the high-voltage switch rests on the fixed contact element thereof, thus closing the high-voltage switch. The rectangle illustrated by interrupted lines in FIGS. 1 and 2 is a schematic indication of a fixing device 16 which is illustrated in FIGS. 3 and 4 on a section plane rotated through 90° with respect to the section plane in FIGS. 1 and 2.

Figure 3:
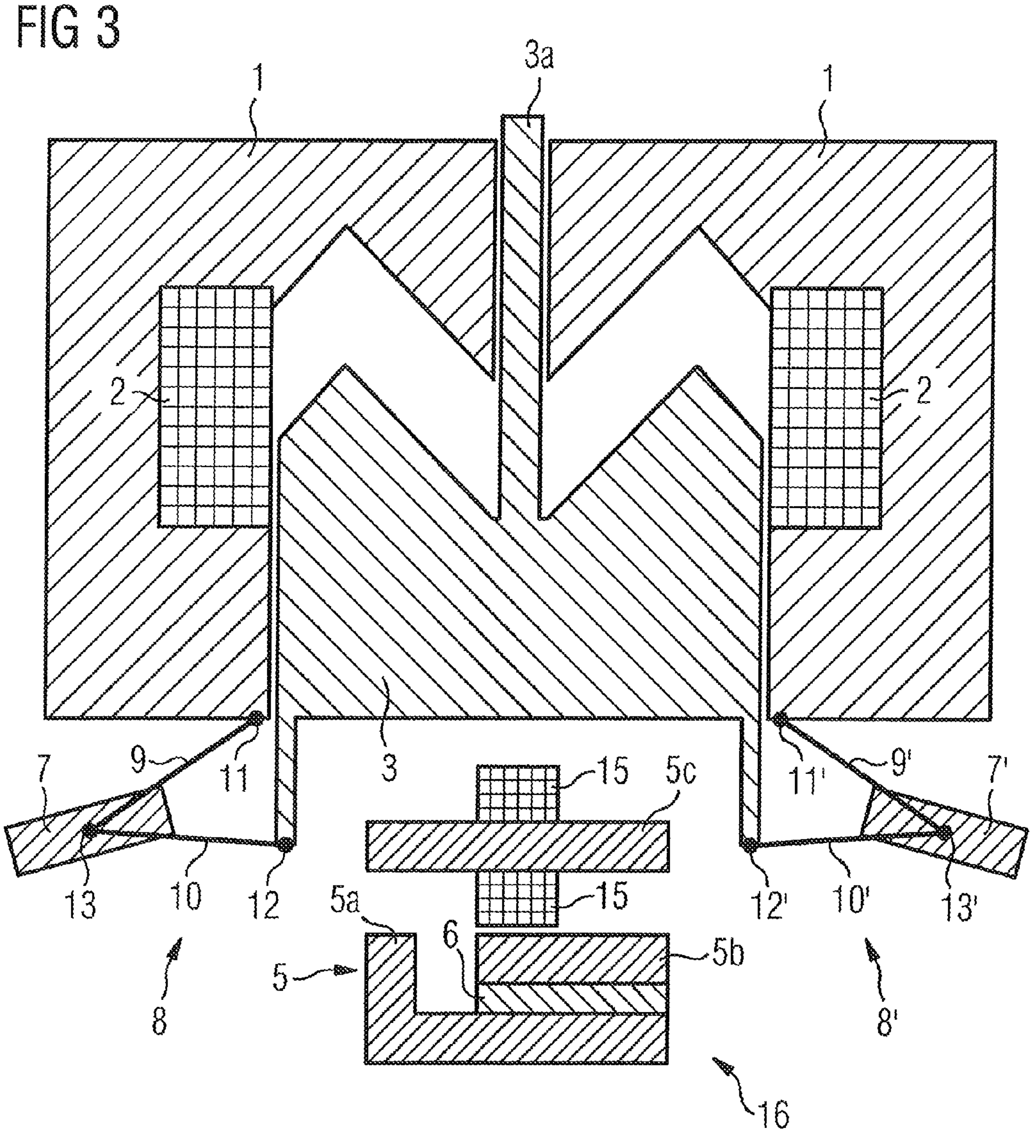
FIG. 3 shows a section view of the actuating device shown in FIG. 1, with a section plane rotated through 90° in comparison to the section plane in FIG. 1.
Figure 4:
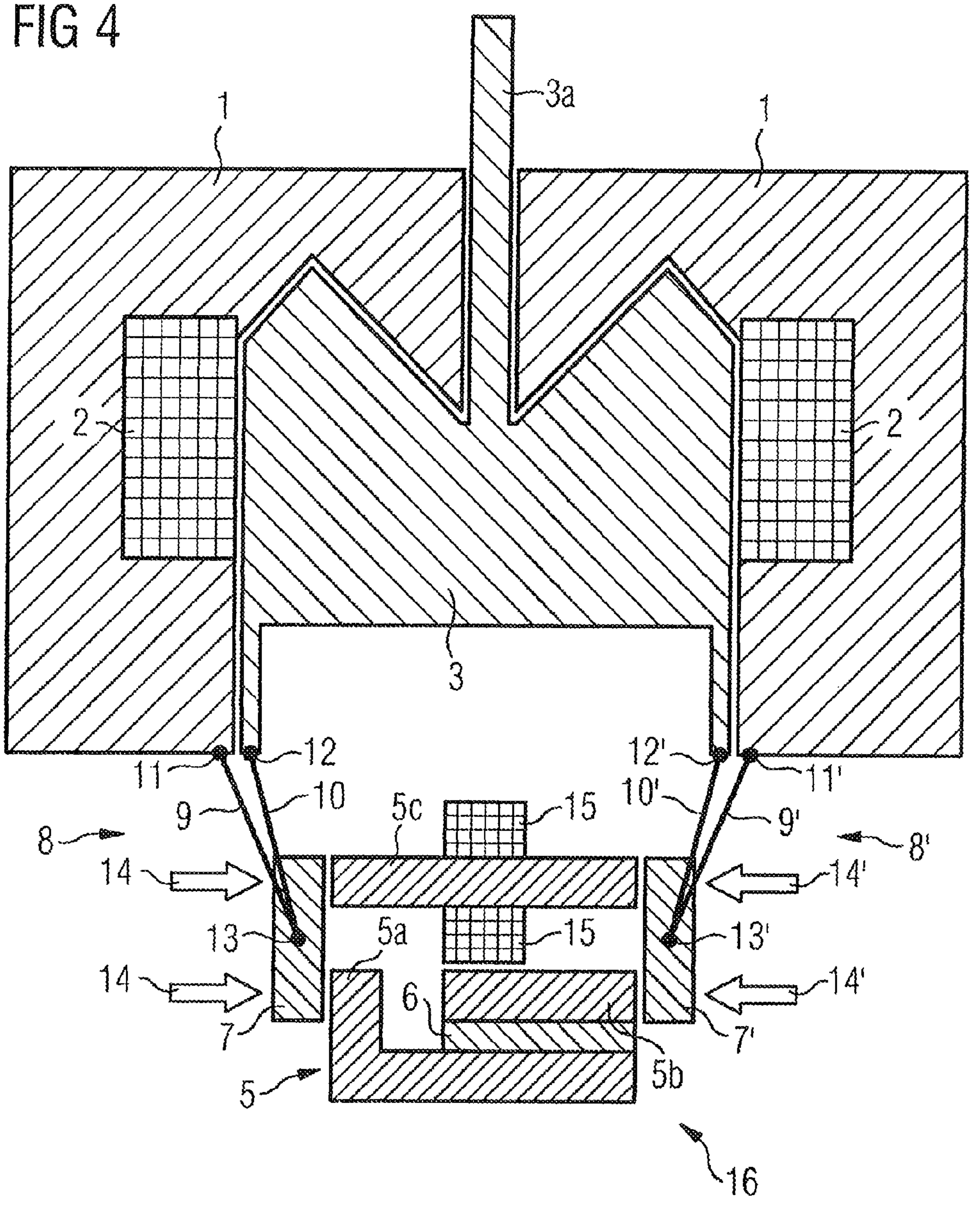
FIG. 4 shows a section view of the actuating device as shown in FIG. 2, with a section plane rotated through 90° with respect to the section plane in FIG. 2.

The fixing device 16 illustrated in FIGS. 3 and 4 comprises an open iron circuit 5, a permanent magnet 6 and a magnetic disconnection coil 15. The open iron circuit comprises three, preferably fixed, individual iron parts 5*a*, 5*b* and 5*c*. The first iron part 5*a* and the second iron part 5*b* are connected to one another via the permanent magnet 6, while a third iron part 5*c* is arranged offset upwards with respect to the first two iron parts 5*a* and 5*b*. This third iron part 5*c* is surrounded by the magnetic disconnection coil.

If, as is illustrated in FIG. 4, two holding elements 7, 7', which are formed from ferromagnetic material or iron, rest on side contact surfaces of the open iron circuit 5, the open iron circuit 5 and the holding elements 7 and 7' form a closed iron circuit. The magnetic lines of force produced by the permanent magnet 6 now run in the closed iron circuit, and thus form a closed magnetic-field circuit. In the present magnetic iron circuit, the holding elements 7 and 7' are each fixed at two points, specifically their respective contact surfaces with the two iron parts 5*b* and 5*c* on the fixing device 16. The splitting of the permanent-magnetic holding force, which is produced by the permanent-magnet flux, between four series-connected holding surfaces in the closed iron circuit results in multiple use of the magnetic flux, thus making it possible to reduce the required magnet volume.

The two holding elements 7 and 7' are respectively arranged on a lever arrangement 8 or 8', which is in the form of a lever transmission. The two lever arrangement 8 and 8', respectively, have a first respective lever 9 and 9' as well as a second respective lever 10 and 10', which is connected thereto via a respective lever connection joint 13 or 13'. The first levers 9 and 9', respectively, are connected to the reference element 1 via a first respective rotating joint 11 or 11'. The second levers 10 and 10', respectively, are connected to the actuating element 3 via a respective second rotating joint 12 or 12'. In this case, the first lever arrangement 8 is located to the left of the fixing device 16 in the section view shown in FIGS. 3 and 4, and the second lever arrangement 8' is located to its right. The respective holding elements 7 and 7' are attached to the respectively associated lever connection joint 13 or 13'.

If the actuating element 3 is now moved from the disconnected position, as shown in FIG. 3, by means of the magnetic drive coil 2 to the connected position as shown in FIG. 4, then the holding elements 7 and 7' are moved towards the fixing device 16. In the connected position, the holding elements 7 and 7' rest on the respective contact surfaces of the open iron circuit 5, and are fixed on them by means of the magnetic force produced by the permanent magnet 6. This magnetic holding force 14 or 14' is sufficient to hold the actuating element 3 in the connected position against the resetting force of the reset springs 4 and 4', respectively. In this case, it should be noted that the step-up ratio of the force created by the lever arrangement 8 or 8', respectively, means that a holding force 14 or 14', respectively, which is less than the force of the reset springs 4 or 4', respectively, is adequate. In the case of the actuating device according to the invention, the respective holding force 14 or 14' may, for example, be less by a factor of 10 than the resetting force of the reset springs 4 and 4'.

Figure 5:
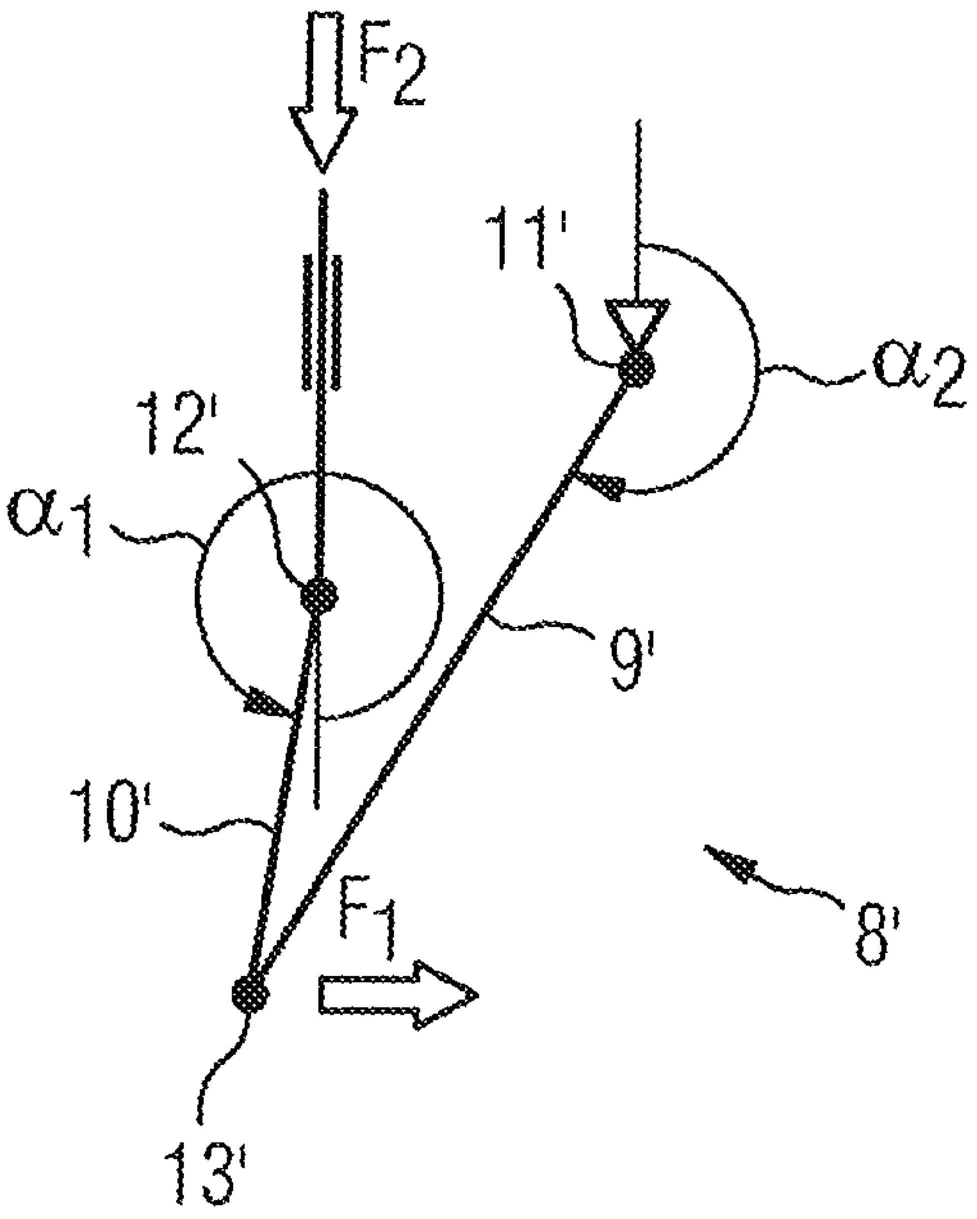
FIG. 5 shows a schematic illustration of the force applied to a lever arrangement of the actuating device according to the invention.

FIG. 5 shows the force step-up ratio produced by the lever arrangement 8' in the connected position as illustrated in FIG. 4. In this case, a force F2 which is applied to the first rotating joint 12' of the lever arrangement in the movement direction of the actuating element 3 acts, with respect to a force F1 which acts at right angles to the force F2 at the lever connection joint 13', as follows:

$$\frac{F1}{F2} = \tan\alpha_1 + \tan\alpha_2 \tag{1}$$

where $\alpha_1$ is the outside angle between the direction of the force F2 and the direction of the first lever 9', and $\alpha_2$ is the outside angle between the direction of the force F2 and the direction of the second lever 10'.

If the intention is now to move the actuating element 3 from the connected position as shown in FIG. 4 to the disconnected position as shown in FIG. 3, then the magnetic disconnection coil 15 produces a magnetic field in the opposite direction to the magnetic field produced by the permanent magnet 6 in the closed iron circuit. The magnetic holding force 14 or 14', respectively, is therefore, reduced such that the resetting force exerted on the actuating element by the respective reset springs 4 and 4' is sufficient to move the actuating element 3 back to the disconnected position. As a result of the increasing distance between the holding elements 7, 7' and the fixing device 16, the resetting force overcomes the holding force as the disconnection process proceeds further, even without any current flowing through the disconnection coil 15, as a result of which the disconnection process is then driven solely by the reset springs 4, 4'. The disconnection movement is limited and damped by an outer stop, which is not illustrated, and a damper.

The described actuating device represents an electromagnetic drive with a long travel, in which the disconnection energy is stored in the reset springs. This configuration makes it possible to reduce the amount of electrical energy stored for a so-called OCO switching sequence. As illustrated, position fixing is provided by a permanent magnet in the connected position while, in contrast, mechanical position fixing is provided by the prestressing of the reset springs in the disconnected position. The connected position and the disconnected position are the only two stable positions of the actuating device.

Before the OCO switching sequence, the actuating device is in the connected position, which means that the energy for the first disconnection process is already stored in the reset springs. The energy for the second disconnection process is supplied to the system during the connection process (the reset springs are stressed). Only the energy for one connection process need therefore be stored for an OCO switching sequence (for example in capacitors), with this energy corresponding to the energy required by the system for one connection and disconnection process, since the reset springs are stressed during the connection process. In comparison to electromagnetic drives without a mechanical energy store, for example springs, the actuating device according to the invention means that there is no need to store the energy for the first disconnection process.

LIST OF REFERENCE SYMBOLS

1 Reference element
2 Magnetic drive coil
3 Actuating element
3*a* Actuating rod
4 First reset spring
4' Second reset spring
5 Open iron circuit
5*a* First iron part
5*b* Second iron part
5*c* Third iron part
6 Permanent magnet
7 First holding element
7' Second holding element
8 First lever arrangement
8' Second lever arrangement
9 First lever of the first lever arrangement
9' First lever of the second lever arrangement
10 Second lever of the first lever arrangement
10' Second lever of the first lever arrangement
11 First rotating joint of the first lever arrangement
11' First rotating joint of the second lever arrangement
12 Second rotating joint of the first lever arrangement
12' Second rotating joint of the second lever arrangement
13 Lever connection joint of the first lever arrangement
13' Lever connection joint of the second lever arrangement
14 Holding force on the first holding element
14' Holding force on the second holding element
15 Magnetic disconnection coil
16 Fixing device

The invention claimed is:

1. A magnetic actuating device, comprising:
- a reference element;
- an actuating element disposed to move relative to said reference element between a first limit position and a second limit position, at least one of said reference element and said actuating element formed from a magnetic material;
- a drive coil for producing a magnetic field for moving said actuating element from the first limit position to the second limit position;
- a mechanical tensioning apparatus for storing mechanical energy by which said actuating element can be moved from the second limit position to the first limit position;
- a fixing device for producing a magnetic holding force for fixing said actuating element in the second limit position relative to said reference element, said fixing device containing a fixing unit having a permanent magnet and is separate from said actuating element;
- a lever configuration coupling said reference element to said actuating element, said lever configuration converting a first force exerted by said actuating element on said lever configuration in a movement direction of said actuating element to a second force acting transversely with respect to the first force and having a smaller magnitude; and
- said lever configuration having a rotating joint, a first lever rotatably attached to said reference element, and a second lever rotatably attached to said actuating element, said first lever and said second lever being connected to one another via said rotating joint.

2. The magnetic actuating device according to claim 1, wherein said fixing unit is disposed separately from said reference element.

3. The magnetic actuating device according to claim 1, wherein both said reference element and said actuating element are formed from said magnetic material.

4. The magnetic actuating device according to claim 3, wherein said magnetic material is a ferromagnetic material.

5. The magnetic actuating device according to claim 1, wherein the magnetic holding force produced by said fixing device acts transversely with respect to a movement direction of said actuating element.

6. The magnetic actuating device according to claim 1, wherein when said actuating element is in the second limit position, a switch which is operated by said actuating element produces a conductive connection.

7. The magnetic actuating device according to claim 1, further comprising a holding element coupled to said rotating joint connecting said first and second levers, said holding element composed of a magnetic material.

8. The magnetic actuating device according to claim 7, wherein said permanent magnet of said fixing device generating a magnetic field for fixing said holding element on said fixing device which is fixed relative to said reference element.

9. The magnetic actuating device according to claim 7, wherein said fixing device and said holding element form parts of a closed iron circuit in a position in which said holding element is fixed on said fixing device.

10. The magnetic actuating device according to claim 1, wherein said mechanical tensioning device has a reset spring.

11. The magnetic actuating device according to claim 1, wherein said fixing device has a magnetic disconnection coil, by which an opposing magnetic field can be produced, which counteracts the holding force produced by said permanent magnet.

12. A switching apparatus, comprising:
- a switch; and
- a magnetic actuating device for operating said switch, said magnetic actuating device including:
  - a reference element;
  - an actuating element disposed to move relative to said reference element between a first limit position and a second limit position, at least one of said reference element and said actuating element formed from a magnetic material;
  - a drive coil for producing a magnetic field which moves said actuating element from the first limit position to the second limit position;
  - a mechanical tensioning apparatus for storing mechanical energy by which said actuating element can be moved from the second limit position to the first limit position;
  - a fixing device for producing a holding force for fixing said actuating element in the second limit position relative to said reference element, said fixing device containing a fixing unit having a permanent magnet and is separate from said actuating element;

a lever configuration coupling said reference element to said actuating element, said lever configuration converting a first force exerted by said actuating element on said lever configuration in a movement direction of said actuating element to a second force acting transversely with respect to the first force and having a smaller magnitude; and said lever configuration having a rotating joint, a first lever rotatably attached to said reference element, and a second lever rotatably attached to said actuating element, said first lever and said second lever being connected to one another via said rotating joint.

* * * * *